United States Patent [19]

Hatori

[11] Patent Number: 5,048,936
[45] Date of Patent: * Sep. 17, 1991

[54] LIGHT BEAM DEFLECTOR

[75] Inventor: Masami Hatori, Kanagawa, Japan

[73] Assignee: Fuji Photo Film Co., Ltd., Kanagawa, Japan

[*] Notice: The portion of the term of this patent subsequent to May 29, 2007 has been disclaimed.

[21] Appl. No.: 291,018

[22] Filed: Dec. 28, 1988

[30] Foreign Application Priority Data

Dec. 29, 1987 [JP] Japan ................. 62-335503
Dec. 29, 1987 [JP] Japan ................. 62-335504

[51] Int. Cl.$^5$ ................. G02B 6/10
[52] U.S. Cl. ................. 385/7; 359/305
[58] Field of Search ........... 350/352, 96.14, 96.13

[56] References Cited

U.S. PATENT DOCUMENTS

| | | | |
|---|---|---|---|
| 4,523,803 | 6/1985 | Arao et al. | 350/358 X |
| 4,595,253 | 6/1986 | Yamashita et al. | 350/358 X |
| 4,644,267 | 2/1987 | Tsui et al. | 350/358 X |
| 4,693,548 | 9/1987 | Tsunoi | 350/358 X |
| 4,696,551 | 9/1987 | Amano et al. | 350/358 |
| 4,810,068 | 3/1989 | Shimazu et al. | 350/358 |
| 4,843,335 | 7/1989 | Amano | 350/358 |
| 4,929,043 | 5/1990 | Hatori | 350/96.13 |

FOREIGN PATENT DOCUMENTS 0242921 10/1987 Japan ................. 350/358
0242922 10/1987 Japan ................. 350/358

Primary Examiner—Eugene R. LaRoche
Assistant Examiner—M. Shingleton
Attorney, Agent, or Firm—Sughrue, Mion, Zinn Macpeak & Seas

[57] ABSTRACT

A light beam deflector employs first and second surface elastic waves to diffract guided waves split from a single light beam introduced into an optical waveguide. The surface elastic waves are generated respectively by first and second tilted-finger chirped interdigital transducers or curved-finger interdigital transducers which are arranged such that the first and second guided waves emittted out of the optical waveguide will scan a surface along respective aligned scanning lines, the ends of which scanning lines are adjacent to each other. The light beam deflector allows a large image to be recorded or read out because it has a wide deflection angle range. The first and second interdigital transducers may alternatively be arranged such that the first and second guided waves emitted out of the optical waveguide will scan the surface without overlapping each other. The light beam deflector may also include third and fourth interdigital transducers for generating third and fourth surface elastic waves for further diffracting the guided waves to provide an even wider deflection angle range.

12 Claims, 8 Drawing Sheets

LIGHT BEAM DEFLECTOR

BACKGROUND OF THE INVENTION

1. Field of the Invention

The present invention relates to a light beam deflector for deflecting a guided light beam in an optical waveguide by generating a surface elastic wave in the optical waveguide and diffracting the guided light beam with the surface elastic wave, and more particularly to a light beam deflector for deflecting a light beam through a wide angle by combining guided light beams which are deflected by surface elastic waves on an optical waveguide, and a light beam deflector for simultaneously deflecting two light beams to record or read two images, respectively, at the same time.

2. Description of the Prior Art

There is known light beam deflector, as disclosed in Japanese Unexamined Patent Publication No. 61(1986)-183626, which comprises an optical waveguide made of a material capable of propagating a surface elastic wave therethrough. A light beam is applied to the optical waveguide and propagated therethrough as a guided wave. A surface elastic wave is produced in the optical waveguide and directed across the guided wave to diffract the guided wave through Bragg diffraction. The angle of diffraction (i.e., the angle of deflection) of the guided wave is continuously varied by continuously varying the frequency of the surface elastic wave. A light beam deflector of this type is advantageous over a mechanical light beam deflector such as a galvanometer mirror or a polygon mirror, an electro-optic deflector (EOD), and an acousto-optic deflector (AOD), since it may be small in size, light in weight, and highly reliable as it has no mechanical movable parts.

However, a light beam deflector employing an optical waveguide has a problem in that it cannot have a large angle of deflection. More specifically, since the light beam deflecting angle is substantially proportional to the frequency of the surface elastic wave, if a large angle of deflection is to be obtained, then the frequency of the surface elastic wave must be increased to a very high value. Therefore, the frequency of the surface elastic wave would have to be varied over a wide range. In addition, to meet the conditions for Bragg diffraction, the direction of travel of the surface elastic wave would have to be continuously steered to control the angle of incidence of the guided wave on the surface elastic wave.

To meet the above requirements, there has been proposed a light beam deflector, as also disclosed in Japanese Unexamined Patent Publication No. 61(1986)-183626, which has a plurality of interdigital transducers (IDT) for generating respective surface elastic waves, having frequencies which vary over different ranges. The IDTs are oriented such that they emit the surface elastic waves in different directions, and they are alternately switched into and out of operation.

This light beam deflector has a problem in that, since the diffraction efficiency is lowered around the crossover frequency of the surface elastic waves generated by the IDTs, the intensity of the deflected light beam varies depending on the angle of deflection.

An IDT which deflects the light beam through a large angle must be arranged so as to be capable of producing a surface elastic wave having a very high frequency. This will be described below with reference to an example. Assuming that the angle of incidence of the guided wave on the surface elastic wave is $\theta$, then a, the angle of deflection of the guided wave due to an acousto-optic interaction between the surface elastic wave and the guided wave, is $\alpha = 2\theta$, which is expressed as follows:

$$2\theta = 2 \sin^{-1}[\lambda/(2Ne \cdot \Lambda)] \quad (1)$$
$$\simeq \lambda/(Ne \cdot \Lambda)$$
$$= \lambda \cdot f/(Ne \cdot v)$$

where $\lambda$ is the wavelength of the guided wave, Ne is the effective refractive index of the optical waveguide with respect to the guided wave, and $\Lambda$, f, and v are the wavelength, frequency, and speed, respectively, of the surface elastic wave. Therefore, the deflection angle range $\Delta(2\theta)$ becomes:

$$\Delta(2\theta) = \Delta f \cdot \lambda/Ne \cdot v$$

If a deflection angle range $\Delta(2\theta) = 10°$ is to be obtained with $\lambda = 0.78$ μm, Ne = 2.2, and v = 3500 m/s, for example, then the frequency range of the surface elastic wave, i.e., the range of high frequencies to be applied to the IDT, must vary by 1.72 GHz. If this frequency range is selected to be 1 octave so as not to be affected by secondary diffracted light, then the central frequency is $f_0 = 2.57$ GHz, and the maximum frequency is $f_2 = 3.43$ GHz. The wavelength $\Lambda$ of the surface elastic wave produced by the IDT to obtain the maximum frequency $f_2$ becomes $\Lambda = 1.02$ μm, and the line width W of the electrode fingers of the IDT becomes $W = \Lambda/4 = 0.255$ μm.

With the conventional photolithographic and electron beam printing processes used for fabricating IDTs, the limits for the line widths at present are 0.8 μm and 0.5 μm, respectively. It is therefore impossible to fabricate an IDT having very small line widths as described above. Even if such a finely fabricated IDT could be produced in the future, it would be difficult and highly expensive to produce a driver for generating frequencies as high as 3.43 GHz, and it would be difficult to apply a high voltage to such an IDT. Moreover, if the frequency of the surface elastic wave is increased, as described above, the wavelength thereof is reduced, and hence the surface elastic wave is absorbed to a greater extent by the optical waveguide, resulting in a reduction in the diffraction efficiency.

The IEEE Transactions on Circuits and Systems, vol. CAS-26, No. 12, p. 1072 [Guided - Wave, Acousto-optic Bragg Modulators for Wide-Band Integrated Optic Communications and Signal Processing] by C. S. TSAI, does not disclose a light beam deflector, in which a plurality of IDTs are switched into and out of operation, but does disclose a single IDT constructed as an IDT having arcuate electrode fingers, each having a continuously varying line width for continuously varying the frequency and the direction of travel of a surface elastic wave over a wide range. The disclosed arrangement eliminates the aforesaid problem of variation in the intensity of a light beam, which variation depends on the angle of deflection of the light beam, but still requires the surface elastic wave to have a high frequency.

There is a demand in the medical field, for example, for recording or reproducing two images, formed with different magnification ratios or under different image processing conditions, on a single medium for medical diagnosis. Light beam deflectors of the type described above may be employed for scanning a photosensitive medium with a light beam both to record an image and also to record two images simultaneously thereon. Two images may be recorded on the photosensitive medium by dividing the light beam deflection angle range into two deflection angle ranges and modulating the light beams in the respective deflection angle ranges with different image signals.

It is also possible to employ the above light beam deflectors in constructing a light beam scanning reading apparatus used for simultaneously reading out two images. In such a light beam scanning reading apparatus, an original medium with two images recorded thereon is scanned by a light beam to cause it to emit or reflect light. Then, an image signal is produced by photoelectrically detecting the light emitted or reflected when the original medium was exposed, dividing the deflection angle into two ranges, and thus extracting two image signals representing the two images, respectively.

Inasmuch as it is difficult for light beam deflectors of the above type to provide a large deflection angle range, however, any light beam deflection angle range available when using the light beam deflector for recording or reading out two images is small because it is a division of an already inherently small deflection angle range. With such a small deflection angle range, only small-sized images can be recorded or read out.

SUMMARY OF THE INVENTION

It is an object of the present invention to provide a light beam deflector which can provide a wide deflection angle range with no variation in the intensity of a light beam deflected and also without increasing the frequency of a surface elastic wave generated to deflect the light beam.

It is also an object of the present invention to provide a light beam deflector which can be employed to record or read out two images simultaneously and can provide a large light beam deflection angle range for recording or reading out each of two such images.

According to a first aspect of the present invention, there is provided a light beam deflector for diffracting and deflecting, with surface elastic waves, a guided wave traveling through an optical waveguide which is made of a material capable of propagating the surface elastic waves therethrough, the light beam deflector comprising:

light beam splitting means for dividing a single light beam introduced into said optical waveguide into a first guided wave and a second guided wave which are to be guided along respective first and second light paths through said optical waveguide;

first surface elastic wave generating means for generating in said optical waveguide a first surface elastic wave which travels across said first light path to diffract and deflect said first guided wave traveling along said first light path;

second surface elastic wave generating means for generating in said optical waveguide a second surface elastic wave which travels across said second light path to diffract and deflect said second guided wave traveling along said second light path; and said first and second surface elastic wave generating means being arranged such that said first and second guided waves emitted out of said optical waveguide will scan a surface along respective aligned lines having ends which are adjacent to each other.

According to a second aspect of the present invention, a light beam deflector comprises, in addition to the first and second surface elastic wave generating means and the light beam splittig means, third surface elastic wave generating means for generating in said optical waveguide a third surface elastic wave which travels across a light path of said first guided wave deflected by said first surface elastic wave to further diffract and deflect said first guided wave;

fourth surface elastic wave generating means for generating in said optical waveguide a fourth surface elastic wave which travels across a light path of said second guided wave deflected by said second surface elastic wave to further diffract and deflect said second guided wave;

said first and third surface elastic wave generating means being arranged to continuously vary the frequencies and directions of said first and third surface elastic waves while meeting the conditions:

$$|k_1| + |K_1| = |k_2|$$

$$|k_2| + |K_2| = |k_3|$$

where $|k_1|$ is the wave vector of the first guided wave before it is diffracted by said first surface elastic wave, $|k_2|$ is the wave vector of the first guided wave after it is diffracted by said first surface elastic wave, $|k_3|$ is the wave vector of the first guided wave diffracted by said third surface elastic wave, and $|K_1|$ and $|K_2|$ are the wave vectors of said first and third surface elastic waves;

said second and fourth surface elastic wave generating means being arranged to continuously vary the frequencies and directions of said second and fourth surface elastic waves while meeting the conditions:

$$|k_4| + |K_3| = |k_5|$$

$$|k_5| + |K_4| = |k_6|$$

where $|k_4|$ is the wave vector of the second guided wave before it is diffracted by said second surface elastic wave, $|k_5|$ is the wave vector of the second guided wave after it is diffracted by said second surface elastic wave, $|k_6|$ is the wave vector of the second guided wave diffracted by said fourth surface elastic wave, and $|K_3|$ and $|K_4|$ are the wave vectors of said second and fourth surface elastic waves; and said first, second, third, and fourth surface elastic wave generating means being arranged such that said first and second guided waves emitted out of said optical waveguide will scan a surface along respective aligned lines having ends which are adjacent to each other.

Each of said first, second, third, and fourth surface elastic wave generating means comprises a tilted-finger chirped interdigital transducer having electrode fingers spaced at distances which vary stepwise and oriented in directions which vary stepwise, and a driver for applying an alternating voltage with a continuously varying frequency to said tilted-finger chirped interdigital transducer.

The light beam splitting means may comprise a grating coupler disposed in the optical waveguide or a half mirror.

When the light beam is deflected by the light beam deflector according to the first aspect of the invention, two light beams emitted out of the optical waveguide scan the surface along the aligned lines over a scanning range or length which is the same as that in a light beam deflector for deflecting a single light beam through a wider deflection angle range. The light beam deflector of the invention can therefore provide a total deflection angle range which is wide even if the first and second surface elastic waves do not have a high frequency range.

The above wide deflection angle range can also be provided by the light beam deflector according to the second aspect of the invention. Since the first (second) guided wave deflected by the first (second) surface elastic wave is further deflected by the third (fourth) surface elastic wave to increase the deflection angle of the light beam before it is emitted from the light beam deflector, the light beam deflector of the second aspect can provide a wider deflection angle range than that of the light beam deflector of the first aspect of the invention.

According to a third aspect of the present invention, there is provided a light beam deflector for diffracting and deflecting, with surface elastic waves, a guided wave traveling through an optical waveguide which is made of a material capable of propagating surface elastic waves therethrough, the light beam deflector comprising: light beam splitting means, first surface elastic wave generating means, and second surface elastic wave generating means, which are the same as those of the light beam deflector of the first aspect of the invention, said first and second surface elastic wave generating means being arranged such that said first and second guided waves emitted out of said optical waveguide will scan a surface without overlapping each other.

According to a fourth aspect of the present invention, a light beam deflector comprises, in addition to the first and second surface elastic wave generating means and the light beam splittng means, third surface elastic wave generating means and fourth surface elastic wave generating means which are the same as those of the light beam deflector of the second aspect of the invention, said first, second, third, and fourth surface elastic wave generating means being arranged such that said first and second guided waves emitted out of said optical waveguide will scan a surface without overlapping each other.

When the light beam is deflected by the light beam deflector according to the third aspect of the invention, two light beams emitted out of the optical waveguide scan different areas of a surface, so that different images can be recorded or read out by the respective light beams. Inasmuch as the light beams are deflected by the respective surface elastic waves, the deflection angle range achieved by each of the surface elastic waves can be used for recording or reading out an image.

The recording or reading out of two images can also be accomplished by the light beam deflector according to the fourth aspect of the invention. Since the first (second) guided wave, which was deflected by the first (second) surface elastic wave, is further deflected by the third (fourth) surface elastic wave, the beam deflector of the fourth aspect can provide a wider deflection angle range than that of the light beam deflector of the third aspect of the invention.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
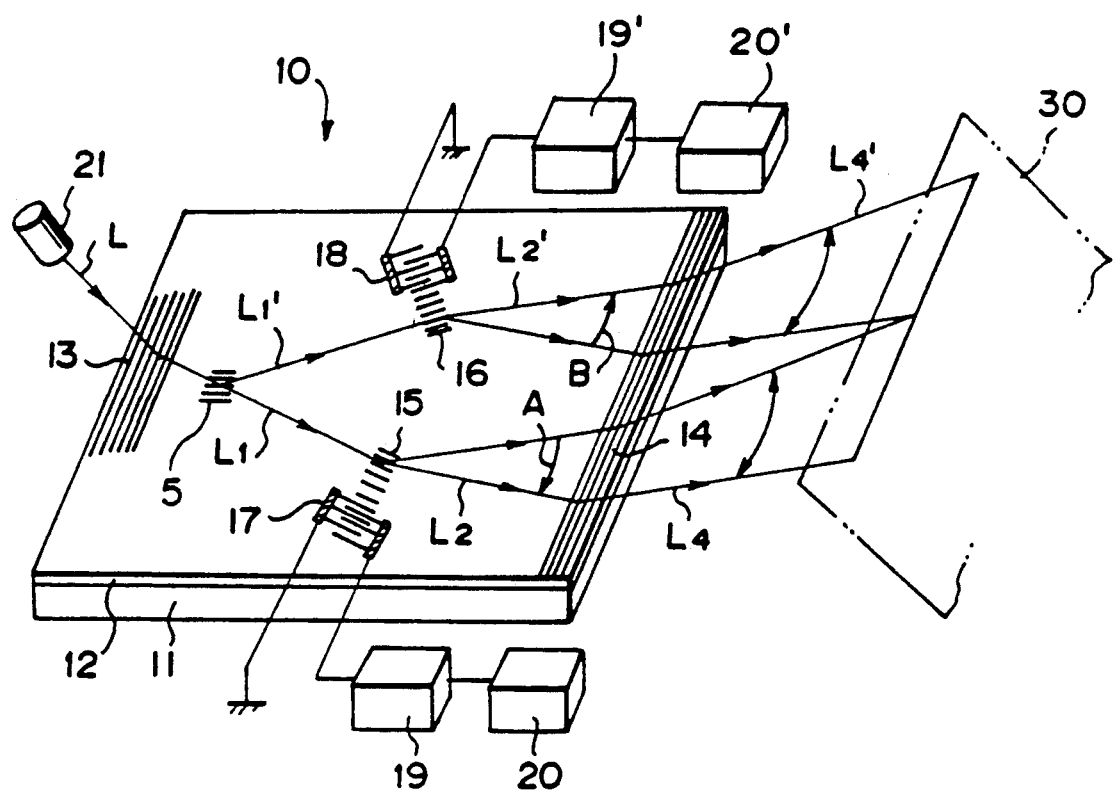
FIG. 1 is a schematic perspective view of a light beam deflector according to a first embodiment of the present invention.

Like or corresponding parts are denoted by like or corresponding reference characters throughout the drawings.

FIG. 1 shows a light beam deflector according to a first embodiment of the present invention. The light beam deflector, generally designated by the reference numeral 10, comprises an optical waveguide 12 on a transparent substrate 11, a linear grating coupler (LGC) 13 on the optical waveguide 12 for introducing a light beam, another LGC 14 on the optical waveguide 12 for emitting a light beam, a pair of first and second tilted-finger chirped interdigital transducers (IDT) 17, 18 on the optical waveguide 12 for generating surface elastic waves 15, 16, respectively, in directions across guided waves $L_1$, $L_1'$ traveling between the LGCs 13, 14, a grating coupler 5 disposed on the optical waveguide 12 as a means for dividing the introduced light beam, a pair of high-frequency amplifiers 19, 19' for applying high-frequency voltages respectively to the tilted-finger chirped IDTs 17, 18 to generate the surface elastic waves 15, 16, and a pair of sweepers 20, 20' for continuously varying or sweeping the frequencies of the signals applied to the amplifiers 19, 19'.

In the first embodiment, the substrate 11 is in the form of a wafer of $LiNbO_3$, for example, and the optical waveguide 12 is formed by providing a Ti-diffused film, for example, on the surface of the wafer. However, the substrate 11 may be a crystalline substrate of sapphire, Si, or the like, and the optical waveguide 12 may comprise a film of any other suitable materials formed by sputtering, evaporation, or the like. Optical waveguides are described in detail in *Integrated Optics* edited by T. Tamir, Topics in Applied Physics, Vol. 7, published by Springer-Verlag, 1975, and *Optical Integrated Circuits* written by Nishihara, Haruna, and Suhara, published by Ohm Co., 1985. The optical waveguide 12 of the present invention may be any of the known optical waveguides. However, the optical waveguide 12 should be made of a material such as diffused Ti capable of propagating a surface elastic wave. The optical waveguide 12 may be of a laminated structure of two or more films or layers.

The tilted-finger chirped LDTs 17, 18 may be formed by, for example, coating a positive electron beam resist on the surface of the optical waveguide 12, evaporating an electrically conductive thin film of Au on the positive electron beam resist, printing an electrode pattern with an electron beam on the thin film of Au, peeling off the thin film of Au, thereafter developing the electrode pattern, then evaporating thin films of Cr and Al on the surface formed thus far, and lifting off the unnecessary layers in an organic solution. If the substrate 11 and the optical waveguide 12 are made of a piezoelectric material, then the tilted-finger chirped IDTs 17, 18 for the generation of the surface elastic waves 15, 16 may be directly disposed in the optical waveguide 12 or on the substrate 11. If the substrate 11 and the optical waveguide 12 are not made of a piezoelectric material, then a piezoelectric thin film of ZnO, for example, is deposited on a portion of the substrate 11 or the optical waveguide 12 by evaporation, sputtering, or the like, and then the IDTs 17, 18 are formed on the piezoelectric thin film.

A light beam L to be deflected is emitted from a light source 21 such as a semiconductor laser toward the LGC 13. The light beam L (parallel-ray beam) is introduced into the optical waveguide 12 by the LGC 13, travels in a guided mode through the optical waveguide 12, and is then divided into a zero-order light beam and a first-order light beam by the grating coupler 5. The zero-order light beam travels as a first guided wave $L_1$ in the optical waveguide 12, and the first-order light beam travels as a second guided wave $L_1'$ in the optical waveguide 12. If the light beam L is a divergent beam, a focusing grating coupler (FGC) may be employed in place of the LGC 13 for converting the convergent light beam into a parallel-ray beam and introducing the parallel-ray beam into the optical waveguide 12.

The first guided wave $L_1$ guided through the optical waveguide 12 is diffracted (Bragg diffraction) into a guided wave $L_2$ as illustrated in FIG. 1 due to an acoustooptic interaction between itself and the first surface elastic wave 15 produced by the first tilted-finger chirped IDT 17. Since the frequency of the alternating voltage applied to the first tilted-finger chirped IDT 17 varies continuously, the frequency of the first surface elastic wave 15 also varies continuously. As is apparent from equation (1) above, because the angle through which the guided wave $L_2$ diffracted by the surface elastic wave 15 is deflected is substantially proportional to the frequency of the surface elastic wave 15, the guided wave $L_2$ is continuously deflected through an angle as indicated at arrow A. The guided wave $L_2$ is then emitted as a light beam $L_4$ out of the optical waveguide 12 by the LGC 14, and the light beam $L_4$ thus emitted one-dimensionally scans the surface 30.

The second guided wave $L_1'$ guided through the optical waveguide 12 is also diffracted (Bragg diffraction) into a guided wave $L_2'$ due to an acoustooptic interaction between itself and the second surface elastic wave 16 produced by the second tilted-finger chirped IDT 18. Since the frequency of the alternating voltage applied to the second tilted-finger chirped IDT 18 also varies continuously, the diffracted guided wave $L_2'$ is continuously deflected through an angle as indicated at arrow B. The guided wave $L_2'$ is then emitted as a light beam $L_4'$ out of the optical waveguide 12 by the LGC 14, and the light beam $L_4'$ thus emitted one-dimensionally scans the surface 30.

According to the present invention, the first and second tilted-finger chirped IDTs 17, 18 are positioned such that the lines traced on the surface 30 by the light beams $L_4$, $L_4'$ emitted out of the optical waveguide 12 are linearly aligned, and Start of Scan (SOS) points Ls, Ls' of the light beams $L_4$, $L_4'$ are located adjacent to each other. Therefore, one main scanning line is provided on the surface 30 by the light beams $L_4$, $L_4'$. In cases where the deflection angle ranges of the guided waves $L_2$, $L_2'$ are the same as each other, the light beam deflector 10 can provide a scanning width or range which is twice as large as that which would have been possible if the applied light beam were deflected by the first surface elastic wave 15 or the second surface elastic wave 16 only. Stated otherwise, the light beam deflector 10 has an apparent deflection angle range which is twice as wide as that of a light beam deflector having only one tilted-finger chirped IDT 17 or 18.

For recording an image on the surface 30 (which may be a photosensitive material) with the light beam deflector 10, the levels of the alternating voltages applied to the first and second tilted-finger chirped IDTs 17, 18 are modulated by an image signal to vary the efficiency with which the guided waves $L_1$, $L_1'$ are diffracted by the respective surface elastic waves 15, 16. To read out an image from the surface 30 (which may have been originally recorded by the method described above), light emitted, reflected, or passing through the image area of the surface 30 which has been scanned by the light beams $L_4$, $L_4'$ is detected by a photoelectric readout means to produce an image signal that represents the recorded image.

If the two light beams (guided waves) $L_1$, $L_1'$ were emitted from separate light sources, respectively, then the intensities of the light beams $L_1$, $L_1'$ would differ from each other due to the light sources' having varying light emission capabilities, and light beams having different intensities being emitted from the light sources because of time-dependent variations in the light beam intensities, or the like. Therefore, when recording an image with such a light beam deflector, image densities would be different on the righthand and lefthand sides of the scanning line, and when reading out a recorded image with such a light beam deflector, different image signal levels would be produced from the righthand and lefthand sides of the scanning line. According to the present invention, since the two light beams $L_1$, $L_1'$ are emitted by a common light source 21, the above problem does not occur insofar as the light beam L is divided by the grating coupler 5 into light beams $L_1$, $L_1'$ having the same intensity. However, the grating coupler 5 may not necessarily be arranged to divide the light beam L into light beams $L_1$, $L_1'$ having the same intensity. More specifically, if there is a difference between the intensities of the light beam (guided waves) $L_1$, $L_1'$, a means for attenuating the guided wave having a greater intensity may be disposed in the optical waveguide 12, or the levels of the alternating voltages applied to the tilted-finger chirped IDTs 17, 18 may be varied depending on the difference between the light beam intensities, which causes a difference between the efficiencies of diffraction of the guided waves by the surface elastic waves 15, 16, so that the intensities of the light beams $L_4$, $L_4'$ will finally be equalized. (For modulating the light beams $L_4$, $L_4'$ with an analog image signal for recording a halftone image, the intensities of the light beams $L_4$, $L_4'$ will be equalized for the same image signal.) Where two light sources are employed as described above, the light emission capability difference between the light sources may be compensated for by the above corrective arrangements, but any difference between the intensities of the light beams $L_4$, $L_4'$ due to time-dependent variations in the light beam intensities, or the like, cannot be eliminated. With the present invention, a problem resulting from a difference in the light emission capability of the sources is not caused because the attenuating means is provided or the levels of the alternating voltages are varied to equalize the light beam intensities.

Figure 2:
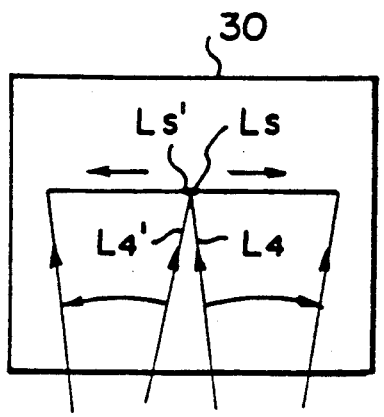
FIGS. 2, 3, and 4 are views showing the directions in which two light beams are deflected in the light beam deflector shown in FIG. 1.
Figure 3:
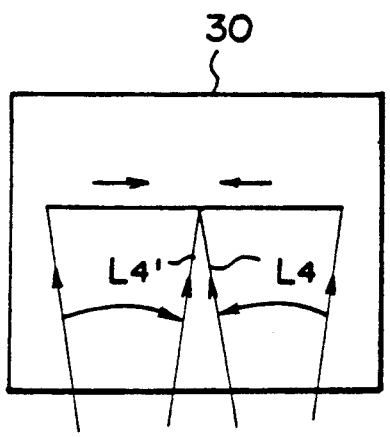
Figure 4:
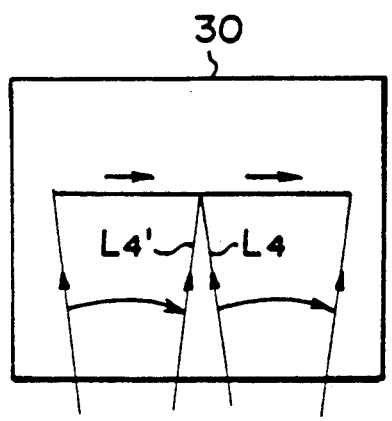

In the above embodiment, the SOS points Ls, Ls' of the light beams $L_4$, $L_4'$ on the surface 30 are disposed adjacent to each other as shown in FIG. 2. However, the IDTs 17, 18 may be arranged and the frequencies of the alternating voltages applied thereto may be varied such that the End of Scan (EOS) points of the light beams $L_4$, $L_4'$ may be located adjacent to each other as shown in FIG. 3, or the SOS point of one of the light beams $L_4$, $L_4'$ and the EOS point of the other light beam may be located adjacent to each other as shown in FIG. 4.

The timing of the deflection of the light beams $L_4$, $L_4'$ may be selected such that the adjacent EOS and/or SOS points are present on the surface 30 at successive times or at nonsuccessive times. More specifically, with reference to FIG. 4, for example, the SOS point of the light beam $L_4$ and the EOS point of the light beam $L_4'$ may occur on the surface 30 at successive times so that the surface 30 is scanned as if by a single light beam. Alternatively, the SOS points of the light beams $L_4$, $L_4'$ may occur on the surface 30 at the same time.

Figure 5:
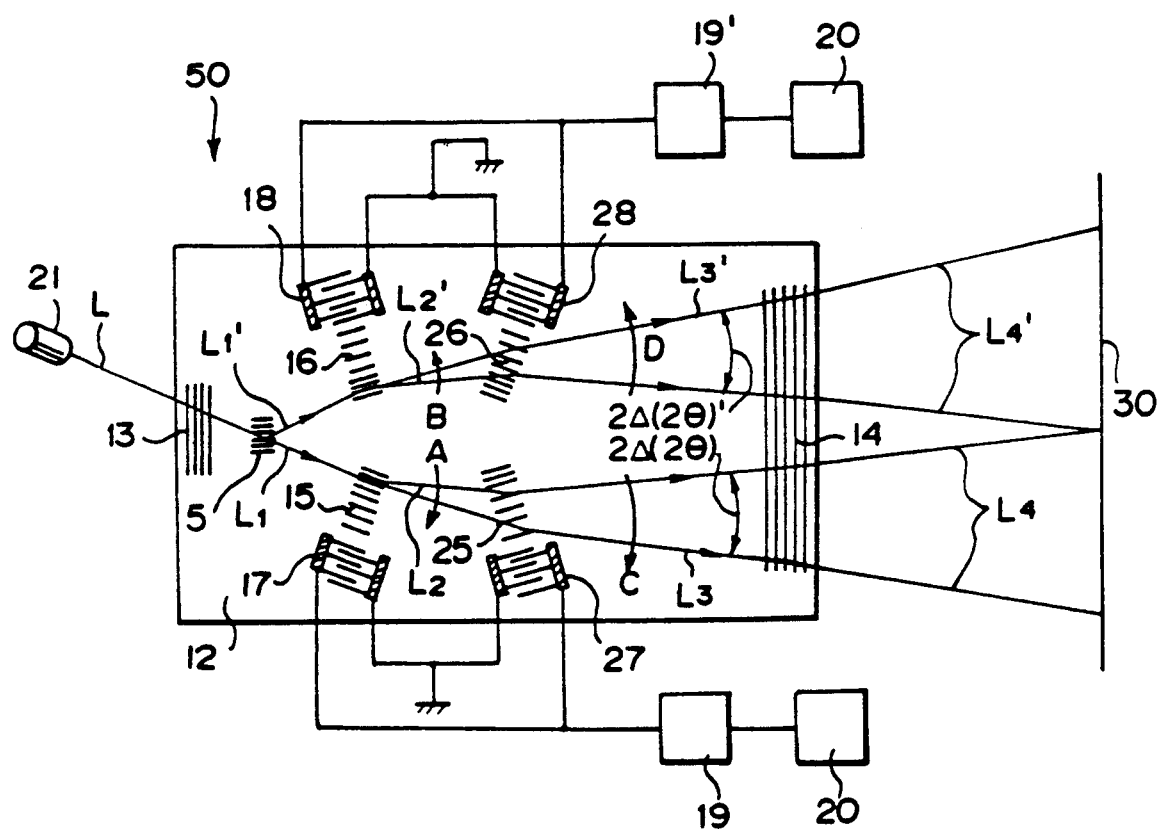
FIG. 5 is a schematic plan view of a light beam deflector according to a second embodiment of the present invention.

FIG. 5 shows a light beam deflector 50 according to a second embodiment of the present invention. The light beam deflector 50 includes first and third tilted-finger chirped IDTs 17, 27 adjacent to each other and second and fourth tilted-finger chirped IDTs 18, 28 adjacent to each other.

The deflected guided wave $L_2$ diffracted by the first surface elastic wave 15 emitted from the first tilted-finger chirped IDT 17 is additionally diffracted so as to be further deflected due to an acousto-optic interaction between itself and a third surface elastic wave 25 produced by the third tilted-finger chirped IDT 27. Since the frequency of the alternating voltage applied to the third tilted-finger chirped IDT 27 varies continuously, the frequency of the third surface elastic wave 25 also varies continuously, and a guided wave $L_3$ that has passed through the third surface elastic wave 25 is continuously deflected through an angle as indicated at arrow C.

The deflected guided wave $L_2'$ diffracted by the second surface elastic wave 16 emitted from the second tilted-finger chirped IDT 18 is additionally diffracted so as to be further deflected due to an acousto-optic interaction between itself and a fourth surface elastic wave 26 produced by the fourth tilted-finger chirped IDT 28. Since the frequency of the alternating voltage applied to the fourth tilted-finger chirped IDT 28 varies continuously, the frequency of the fourth surface elastic wave 26 also varies continuously, and a guided wave $L_3'$ that has passed through the fourth surface elastic wave 26 is continuously deflected through an angle as indicated at arrow D. The guided waves $L_3$, $L_3'$ thus deflected are emitted as light beams $L_4$, $L_4'$ out of the optical waveguide 12 by the LGC 14, and the light beams $L_4$, $L_4'$ thus emitted one-dimensionally scan the surface 30.

The first, second, third, and fourth tilted-finger chirped IDTs 17, 18, 27, 28 are positioned such that the lines traced on the surface 30 by the light beams $L_4$, $L_4'$ emitted out of the optical waveguide 12 are linearly aligned, and the SOS points Ls, Ls' of the light beams $L_4$, $L_4'$ are located adjacent to each other. Therefore, one main scanning line is provided on the surface 30 by the light beams $L_4$, $L_4'$.

Since the two beams $L_1$, $L_1'$ are branched from the single light beam emitted by the common light source 21, the intensities of the light beams $L_4$, $L_4'$ are equal to each other at all times as with the light beam deflector 10 of the first embodiment.

Figure 6:
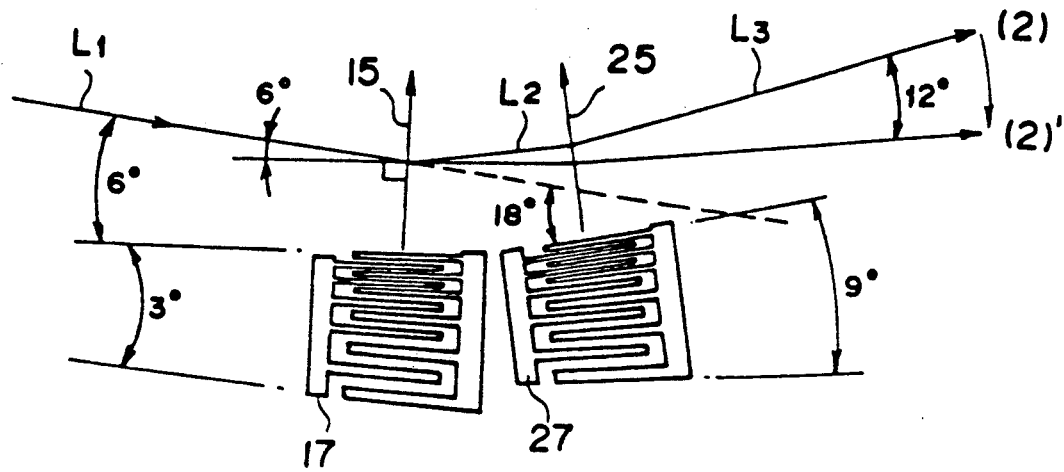
FIG. 6 is an enlarged plan view of a portion of the light beam deflector shown in FIG. 5.

The deflection angle range $2\Delta(2\theta)$ of the guided wave $L_3$ and the deflection angle range $2\Delta(2\theta)'$ of the guided wave $L_3'$ will be described with reference to FIG. 6. In the second embodiment, the second and fourth tilted-finger chirped IDTs 18, 28 are identical in construction to the first and third tilted-finger chirped IDTs 17, 27, except that they are symmetrically arranged on an opposite side of the optical waveguide 12. Voltages are applied to each of these IDTs in the same manner. Therefore, only the deflection angle range $2\Delta(2\theta)$ of the guided wave $L_3$ will be described below. FIG. 6 illustrates in detail the configuration and location of the first and third tilted-finger chirped IDTs 17, 27. As shown in FIG. 6, each of the first and third tilted-finger chirped IDTs 17, 27 has electrode fingers spaced at distances or intervals which vary stepwise at a constant rate of change. The directions of orientation of the electrode fingers also vary stepwise at a constant rate of change. The first and second tilted-finger chirped IDTs 17, 27 are arranged such that the ends thereof (upper ends as shown) having shorter distances between the electrode fingers are positioned closer to the guided wave. When the frequency of the applied voltage is varied, the first and third tilted-finger chirped IDTs 17, 27 produce surface elastic waves 15, 25 at a maximum frequency $f_2 = 2$ GHz from the upper ends thereof and a minimum frequency $f_1 = 1$ GHz from the lower ends thereof. The electrode fingers at the upper and lower ends, respectively, of the first tilted-finger chirped IDT 17 are tilted at 3° with respect to each other, and the IDT 17 is arranged such that the electrode finger at the upper end is tilted at 6° with respect to the direction of travel of the guided wave $L_1$ and the electrode finger at the lower end is tilted at 3° with respect to the direction of travel of the guided wave $L_1$. The electrode fingers at the upper and lower ends, respectively, of the third tilted-finger chirped IDT 27 are tilted at 9° with respect to each other, and the IDT 27 is arranged such that the electrode finger at the upper end is tilted at 18° with respect to the direction of travel of the guided wave $L_1$ and the electrode finger at the lower end is tilted at 9° with respect to the direction of travel of the guided wave $L_1$. Ground electrodes of the first and third tilted-finger chirped IDTs 17, 27 may be integrally formed with each other. The tilted-finger chirped IDTs described above are described in detail in the literature, referred to above, written by C. S. TSAI.

Figure 7A:
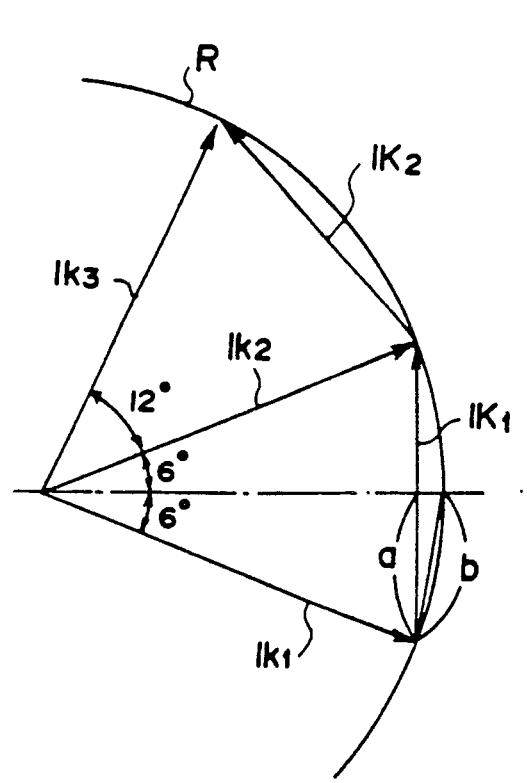
FIGS. 7(a) and 7(b) are views showing the manner in which a light beam is deflected twice in a light beam deflector of the invention.

When the surface elastic waves 15, 25 having a frequency of 2 GHz are generated from the first and second tilted-finger chirped IDTs 17, 27, the light beam is diffracted as indicated by (2) in FIG. 6. In this case, the guided wave $L_1$ is applied at an incident angle of 6° to the surface elastic wave 15 having a frequency of 2 GHz, the incident angle meeting the conditions for Bragg diffraction. More specifically, assuming that the guided wave $L_1$ has a wave vector $|k_1|$, the diffracted guided wave $L_2$ a wave vector $|k_2|$, and the surface elastic wave 15 a wave vector $|K_1|$, the following relationship is met, as shown in FIG. 7(a):

$$|k_1| + |K_1| = |k_2|$$

The direction of travel of the diffracted guided wave $L_2$ is the same as the direction of the vector $|k_2|$ (the deflection angle $\alpha = 2\theta = 12°$). At this time, the surface elastic wave 25 having a frequency of 2 GHz is excited by the electrode finger (lying at angle of 12° with respect to the upper end of the first tilted-finger chirped IDT 17) at the upper end (FIG. 6) of the third tilted-finger chirped IDT 27 and travels in a direction normal to that electrode finger. Therefore, the angle of incidence of the guided wave $L_2$ upon the surface elastic wave 25 is 6°. Since the surface elastic wave 25 has the same wavelength as that of the surface elastic wave 15, the Bragg conditions for diffraction are met. That is, assuming that the guided wave $L_3$ diffracted by the surface elastic wave 25 has a wave vector $|k_3|$ and the surface elastic wave 25 a wave vector $|K_3|$, the following relationship is met, as shown in FIG. 7(a):

$$|k_2| + |K_2| = |k_3|$$

Figure 7B:
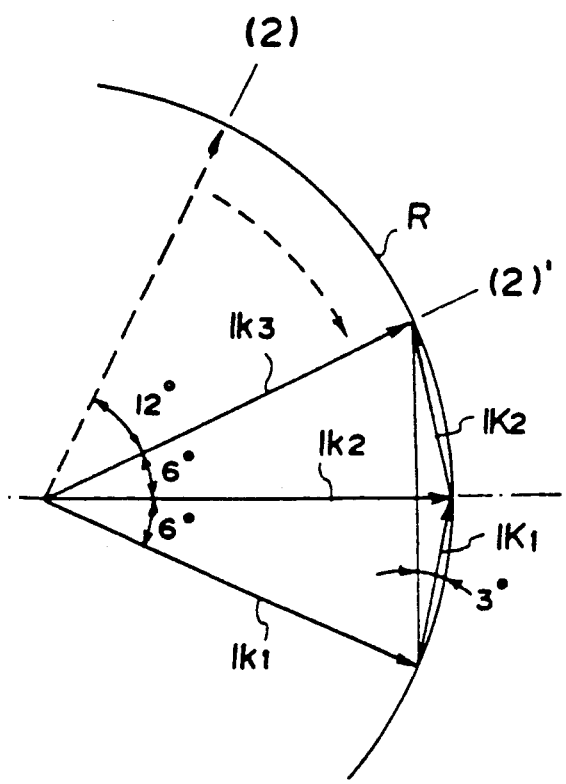

The frequencies of the surface elastic waves 15, 25 are gradually lowered from 2 GHz to 1 GHz. Since the magnitudes $|K_1|, |K_2|$ of the wave vectors $|K_1|, |K_2|$ of the surface elastic waves 15, 25 are $2\pi/\Lambda$ where $\Lambda$ is the wavelength of the surface elastic waves 15, 25, the magnitudes of the wave vectors are proportional to the frequencies of the surface elastic waves 15, 25. When the frequencies of the surface elastic waves 15, 25 are 1 GHz, the magnitudes of the wave vectors $|K_1|, |K_2|$ of the surface elastic waves 15, 25 are ½ of their magnitudes when the frequencies are 2 GHz. The directions of travel of the surface elastic waves 15, 25 at this time, i.e., the directions of the wave vectors $|K_1|, |K_2|$ at the time the surface elastic waves 15, 25 have a frequency of 2 GHz, are angularly displaced by 3° and 9°, respectively, from the directions of the wave vectors $|K_1|, |K_2|$ of the surface elastic waves 15, 25 at the time their frequencies are 1 GHz, since the electrode fingers of the first and third tilted-finger chirped IDTs 17, 27 for exciting the surface elastic waves 15, 25 of 1 GHz are tilted 3° and 9°, respectively, from the electrode fingers thereof for exciting the surface elastic waves 15, 25 of 2 GHz. Since a≃b in FIG. 7(a), the wave vectors $|K_1|, |K_2|$ of the surface elastic waves 15, 25 of 1 GHz are as shown in FIG. 7(b).

The above relationships:

$$|k_1| + |K_1| = |k_2|$$

$$|k_2| + |K_2| = |k_3|$$

are established when the frequencies of the surface elastic waves 15, 25 are 1 GHz.

The magnitude $||k_1||$ of the wave vector $|k_1|$ is $n \cdot 2\pi/\lambda$ (n is the refractive index) where $\lambda$ is the wavelength of the guided wave $L_1$, and the magnitudes of the wave vectors of the guided waves $L_2, L_3$ are also $n \cdot 2\pi/\lambda$. Therefore, the following relationships are established at all times:

$$||k_1|| = ||k_2|| = ||k_3||$$

Since the magnitude of the wave vector $|K_1|$ of the surface elastic wave 15 is $2\pi/\Lambda$ where $\Lambda$ is the wavelength thereof, and the wavelength of the surface elastic wave 15 is the same as the wavelength of the surface elastic wave 25, the following relationship is obtained:

$$||K_1|| = ||K_2||$$

The directions of the wave vectors $|K_1|, |K_2|$ are varied at respective inherent rates of change when the frequencies of the surface elastic waves 15, 25 vary from 2 GHz to 1 GHz as described above. Consequently, while the frequency of the surface elastic waves 15, 25 is varying from 2 GHz to 1 GHz, the above relationships:

$$|k_1| + |K_1| = |k_2|$$

$$|k_2| + |K_2| = |k_3|$$

and the Bragg conditions for diffraction of the guided wave $L_1$ by the surface elastic wave 15 and the Bragg conditions for diffraction of the guided wave $L_2$ by the surface elastic wave 25 are met at all times.

As can be understood from the above description, when the frequencies of the surface elastic waves 15, 25 are 2 GHz and 1 GHz, the directions of travel of the guided wave $L_3$ which has been diffracted twice are the same as the direction of the vector $|k_3|$ in FIG. 7(a) and the direction of the vector $|k_3|$ in FIG. 7(b), respectively, (these vector directions are indicated by (2) and (2)', respectively, in FIG. 6). The difference between these directions is $2\Delta(2\theta) = 24 - 12 = 12°$. The light beam deflector 50 therefore provides a wide deflection angle range of 12° in the optical waveguide. If the light beam were deflected by only one surface elastic wave with its frequency varying from 1 GHz to 2 GHz (the frequency range is 1 octave so as not to be affected by secondary diffracted light), then the deflection angle range would be 6°, half of the above deflection angle range.

In the second embodiment, the second and fourth tilted-finger chirped IDTs 18, 28 are identical in construction to the first and third tilted-finger chirped IDTs 17, 27, except that they are symmetrically arranged on an opposite side of the optical waveguide 12, and voltages are applied in the same manner as described above to these IDTs. Thus, assuming that the second guided wave $L_1'$ diffracted by the second surface elastic wave 16 has a wave vector $|k_4|$, the second guided wave $L_2'$ diffracted by the second surface elastic wave 16 has a wave vector $|k_5|$, the second guided wave $L_3'$ diffracted by the fourth surface elastic wave 26 has a wave vector $|k_6|$, and the surface elastic waves 16, 26 have respective wave vectors $|K_3|$ and $|K_4|$, the following relationships are always met:

$$|k_4| + |K_3| = |k_5|$$

$$|k_5|+|K_4|=|k_6|$$

The deflection angle range $2\Delta(2\theta)'$ of the guided wave $L_3'$ is 12° which is the same as the deflection angle range $2\Delta(2\theta)$ of the guided wave $L_3$.

The deflection angle ranges $\Delta\delta$, $\Delta\delta'$ of the light beams $L_4$, $L_4'$ emitted out of the optical waveguide 12 are wider than the deflection angle ranges $2\Delta(2\theta)$, $2\Delta(2\theta)'$ within the optical waveguide 12 since the refractive index of the optical waveguide 12 is larger than the refractive index of air.

The total length over which the surface 30 is scanned by the emitted light beams $L_4$, $L_4'$ is the same as the sum of the length over which the surface 30 is scanned by the light beam $L_4$ that is deflected in the deflection angle range $\Delta\delta$ and the length over which the surface 30 is scanned by the light beam $L_4'$ that is deflected in the deflectin angle range $\Delta\delta'$, and $2\Delta(2\theta)'=2\Delta(2\theta)$ as described above in this embodiment. Therefore, the total length over which the surface 30 is scanned is substantially four times greater than the total length had the light beam been deflected by a single surface elastic wave.

By lowering the frequencies of the surface elastic waves 15, 25 below 1 GHz, the guided wave $L_3$ is deflected beyond the position indicated at (2)' in FIG. 7(b). Since the guided wave $L_2$ that is diffracted once is emitted, though only slightly, toward that position when the surface elastic wave frequency is 2 GHz, it is preferable to employ the range between (2) and (2)' in FIG. 7(b) as a light beam deflection range.

Modifications of the light beam deflector 50 will be described below. The following modifications are directed to the first and third tilted-finger chirped IDTs 17, 27 by way of example, but may be applied to the second and fourth tilted-finger chirped IDTs 18, 28. In the illustrated embodiment, the frequencies of the surface elastic waves 15, 25 vary continuously from 2 GHz to 1 GHz. However, they may be continuously varied from 1 GHz to 2 GHz to deflect the light beam $L_4$ in the opposite direction. The light beam $L_4$ can be reciprocally deflected by varying the surface elastic wave frequency from 2 GHz to 1 GHz to 2 GHz to 1 GHz, so that the surface 30 can be reciprocally scanned by the light beam.

In the illustrated embodiment, the angle of incidence of the guided wave $L_1$ upon the surface elastic wave 15 having a frequency of 2 GHz (i.e., the angle formed between the electrode finger of the first tilted-finger chirped IDT 17 for exciting the surface elastic wave having a frequency of 2 GHz and the direction of travel of the guided wave $L_1$) is 6°, and the angles formed between the electrode fingers of the third tilted-finger chirped IDT 27 for exciting the surface elastic waves having frequencies of 2 GHz and 1 GHz and the direction of travel of the guided wave $L_1$ are 18° and 9°, respectively. However, when the minimum and maximum frequencies of the surface elastic waves 15, 25 are generally indicated by $f_1$ and $f_2$ ($f_2=2f_1$), respectively, the above Bragg conditions for diffraction are met at all times by selecting the angles, which have been set to 6°, 3°, 18°, 9° above, as $\theta$, $\theta/2$, $3\theta$, $3\theta/2$, respectively, as is apparent from FIGS. 7(a) and 7(b).

Even when the configurations of the tilted-finger chirped IDTs 17, 27 are defined according to a predetermined value of $\theta$, the minimum and maximum frequencies $f_1$, $f_2$ of the surface elastic waves 15, 25 may not necessarily be set at $f_2=2f_1$, but the maximum frequency $f_2$ may be slightly lower than $2f_1$. However, as long as the tilted-finger chirped IDTs 17, 27 are configured in the manner described above, the IDT should be used to its best advantage, and the surface elastic wave frequency should preferably be varied from $f_1$, at which the minimum deflection angle range can be achieved without letting secondary diffracted light produced at the minimum frequency $f_1$ enter the deflection angle range, to $f_2=2f_1$.

It is not necessarily required according to the present invention that the minimum and maximum frequencies $f_1$, $f_2$ of the surface elastic waves 15, 25 be selected so that $f_2=2f_1$, nor is it necessary that the frequencies of the surface elastic waves 15, 25 be equal to each other. Even by independently varying the frequencies and directions of travel of the surface elastic waves 15, 25, the above relationships:

$$|k_1|+|K_1|=|k_2|$$

$$|k_2|+|K_2|=|k_3|$$

can be statisfied by the configurations and locations of the first and third tilted-finger chirped IDTs 17, 27.

If the frequencies of the surface elastic waves 15, 25 should be varied in the same manner as in the above embodiment, then the two tilted-finger chirped IDTs can be driven by a common driver. It is advantageous to employ only one driver because the drivers are expensive.

Figure 8:
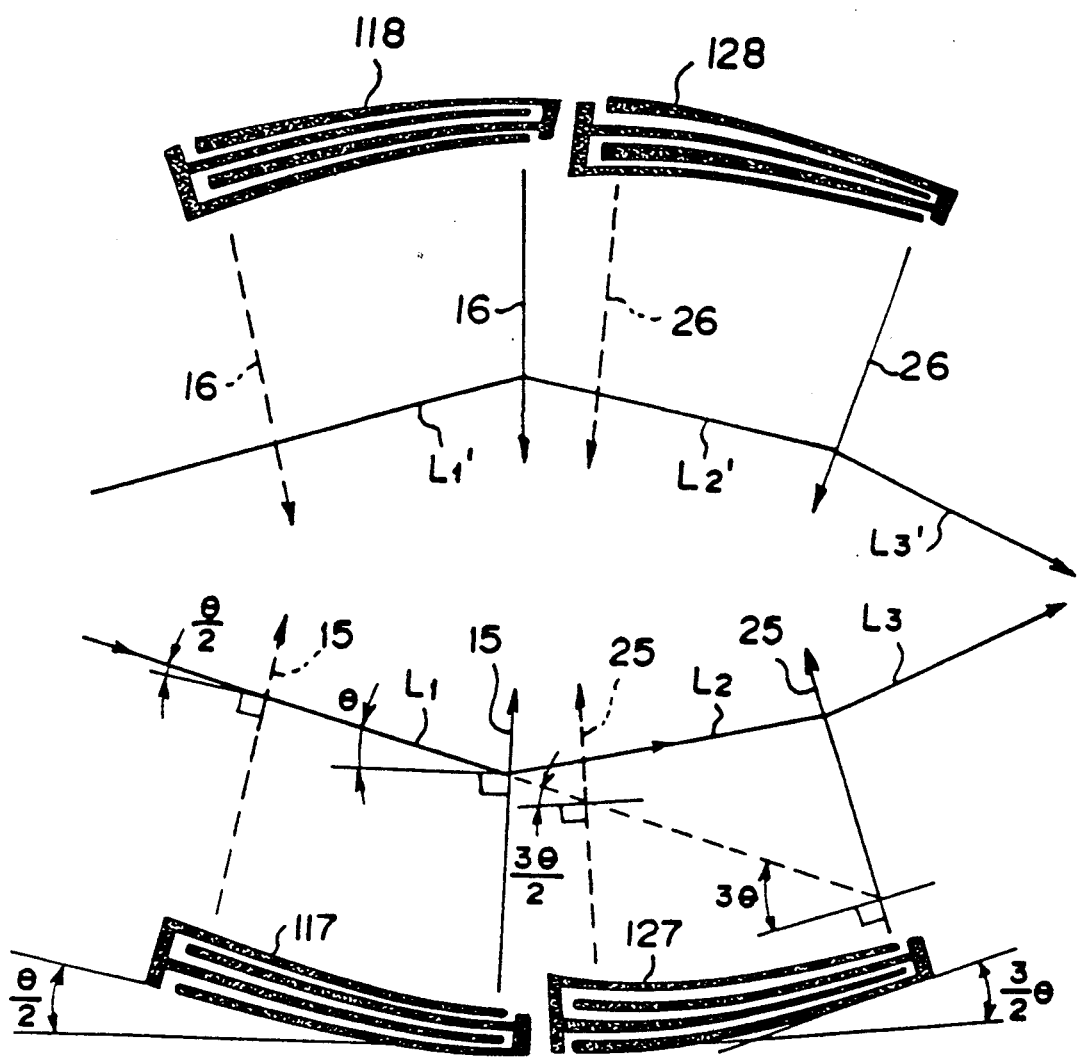
FIG. 8 is a plan view of another means for generating a surface elastic wave in the present invention.

The light beam deflector of the present invention may use curved-finger IDTs in place of the tilted-finger chirped IDTs 17, 18, 27, 28, the curved-finger IDTs each having arcuate electrode fingers which are spaced at distances which vary stepwise. FIG. 8 shows one pattern with which such curved-finger IDTs may be arranged. First and third curved-finger IDTs 117, 127 are constructed such that their right-hand (as shown) end electrode finger portions generate surface elastic waves 15, 25 having a maximum frequency of $f_2$, and their lefthand (as shown) end electrode finger portions generate surface elastic waves 15, 25 (indicated by the broken lines) having a minimum frequency of $f_1$. With $f_2=2f_1$ and the angle of incidence of the guided wave $L_1$ upon the first surface elastic wave 15 of the maximum frequency $f_2$ equal to $\theta$ as shown in FIG. 8, the IDTs 117, 127 should be arranged such that the lefthand end electrode portion of the first curved-finger IDT 117 lies at an angle of $\theta/2$ with respect to the direction of travel of the guided wave $L_1$, and the righthand and lefthand end electrode finger portions of the third curved-finger IDT 127 lie at angles of $3\theta$ and $3\theta/2$ respectively with respect to the direction of travel of the guided wave $L_1$. Second and fourth curved-finger IDTs 118, 128 should be constructed and arranged in the same manner as the IDTs 117, 127.

For introducing the light beam into the optical waveguide 12 and emitting the light beams out of the optical waveguide 12, coupler prisms or the like may be employed rather than the LGCs 13, 14. Alternatively, the light beam may be directly applied to an end face of the optical waveguide 12, and the light beams may be directly emitted from the opposite end face of the optical waveguide 12. Where the light beams L, L' are divergent in nature, they may be converted into parallel-ray beams by a waveguide lens or an ordinary external lens, and the light beams emitted out of the optical waveguide 12 may be converged by such a waveguide lens or ordinary external lens.

If the optical waveguide 12 is made of ZnO rather than Ti-diffused LiNbO$_3$, a deflection angle range of about $2\Delta2(\theta) = 8°$ can be achieved by selecting the maximum and minimum frequencies of the surface elastic waves 15, 25 to be 1.0 GHz and 0.5 GHz, respectively, for example.

The light beam deflector of the present invention may be arranged to propagate three or more surface elastic waves in the optical waveguide in order to deflect a single guided wave three or more times. Since the advantages of the invention, as described above, can be accomplished by two adjacent surface elastic waves, such a modified light beam deflector is included in the scope of the present invention.

The light beam splitting means for dividing a single light beam into two guided waves, cited as the grating coupler 5 above, may instead be a narrow half mirror disposed in the optical waveguide 12 and longitudinally oriented in a direction across the guided waves.

Figure 9:
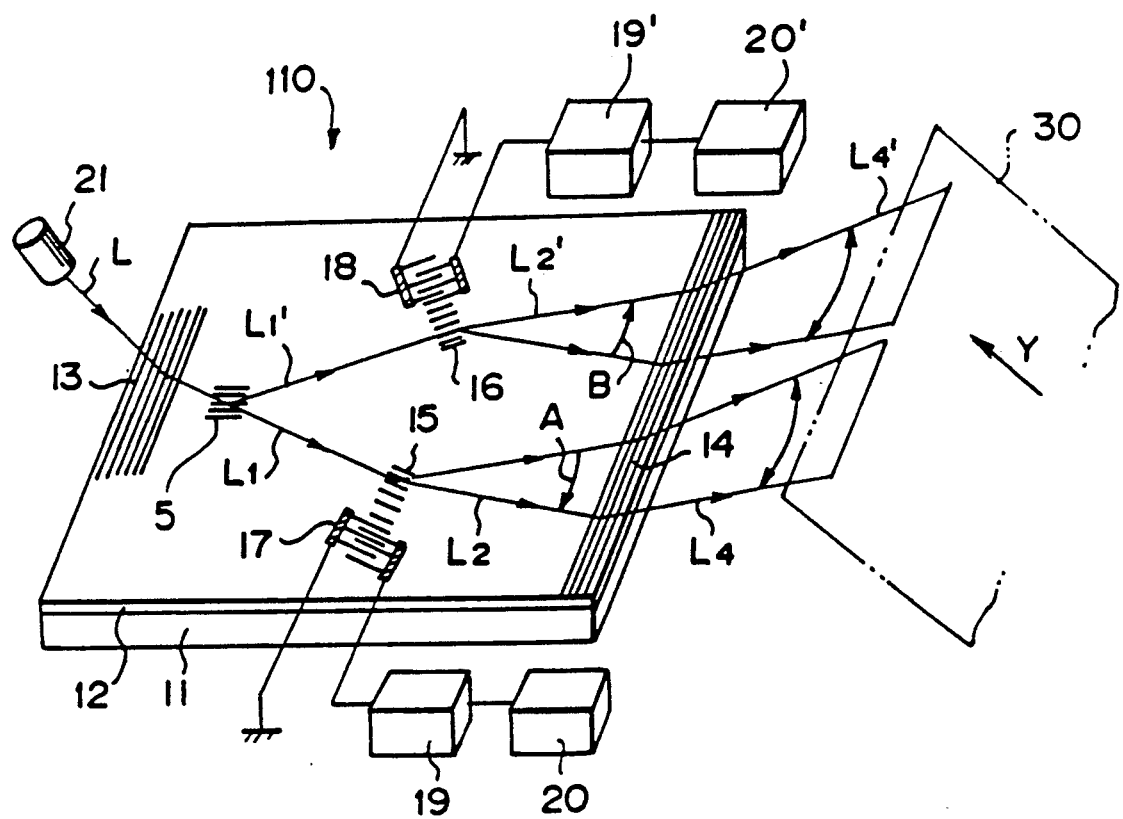
FIG. 9 is a schematic perspective view of a light beam deflector according to a third embodiment of the present invention.
Figure 10:
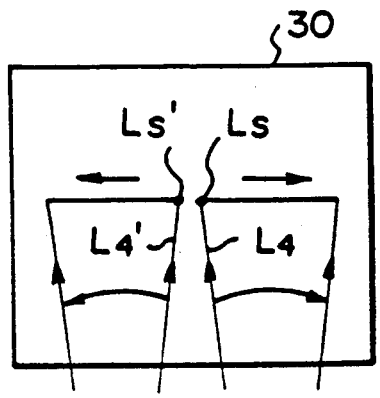
FIGS. 10, 11, and 12 are views illustrating the directions in which two light beams are deflected in the light beam deflector shown in FIG. 9.

A light beam deflector 110 according to a third embodiment of the present invention will be described below with reference to FIG. 9. The light beam deflector 110 of the third embodiment differs from the light beam deflector 10 of the first embodiment with respect to the arrangement of the tilted-finger chirped IDTs 17, 18. More specifically, the first and second tilted-finger chirped IDTs 17, 18 are arranged on the optical waveguide 12 such that the light beams $L_4$, $L_4'$ emitted out of the optical waveguide 12 will not overlap each other on the surface 30, but are directed parallel to each other toward the surface 30, as also shown in FIG. 10. Therefore, the light beams $L_4$, $L_4$, provide separate main scanning lines on the surface 30. By moving the surface 30 with a known auxiliary scanning means (not shown) in the direction indicated by arrow Y, which is normal to the main scanning direction along which the surface 30 is scanned by the light beams $L_4$, $AL_4'$, different areas on the surface 30 are two-dimensionally scanned by the respective light beams $L_4$, $L_4'$.

For recording an image on the surface 30 (which may be made of a photosensitive material) with the light beam deflector 110, the levels of the alternativing voltages applied to the first and second tilted-finger chirped IDTs 17, 18 are modulated by respective image signals to vary the efficiencies of diffraction of the guided waves $L_1$, $L_1'$ by the surface elastic waves 15, 16, thereby recording images represented by the respective image signals on the surface 30. To read out images from the surface 30 (on which the recorded image may have originally been recorded as described above), lights emitted, reflected, or passing through the image areas of the surface 30 which have been scanned by the light beams $L_4$, $L_4'$ are detected by respective photoelectric read-out means to produce image signals that represent the recorded images.

In the light beam deflector 110, the two light beams for recording or reading out respective images are deflected respectively by the first and second surface elastic waves 15, 16. Therefore, each image can be recorded or read out by a light beam which is deflected through the same deflection angle range as that through which a single light beam for recording or reading out an image is deflected.

If the two light beams (guided waves) $L_1$, $L_1'$ were emitted from separate light sources, respectively, then the intensities of the light beams $L_1$, $L_1'$ would differ from each other due to the light sources' having varying light emission capabilities, and light beams with different intensities being emitted from the light sources because of time-dependent variations in the light beam intensities. Therefore, when recording an image with such a light beam deflector, the image densities of the righthand and lefthand images on the surface 30 would be different from each other, and when reading out recorded images with such a light beam deflector, different amplification factors would be required to amplify the image signals from the righthand and lefthand images. According to the present invention, since the two light beams $L_1$, $L_1'$ are emitted by the common light source 21, the above problem does not occur insofar as the light beam L is split by the grating coupler 5 into light beams $L_1$, $L_1'$ having the same intensity.

Figure 11:
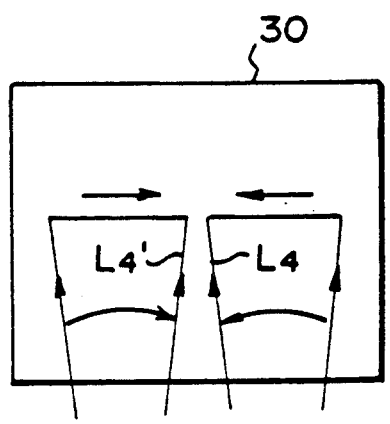
Figure 12:
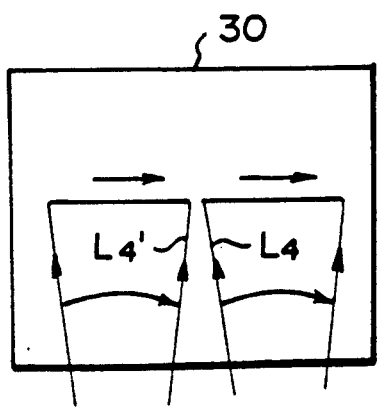

In the third embodiment, the SOS points Ls, Ls' of the light beams $L_4$, $L_4'$ on the surface 30 are disposed adjacent to each other. However, the IDTs 17, 18 may be arranged and the frequencies of the alternating voltages applied thereto may be varied such that the EOS points of the light beams $L_4$, $L_4'$ are located adjacent to each other as shown in FIG. 11, or the SOS point of one of the light beams $L_4$, $L_4'$ and the EOS point of the other light beam are located adjacent to each other as shown in FIG. 12.

Figure 13:
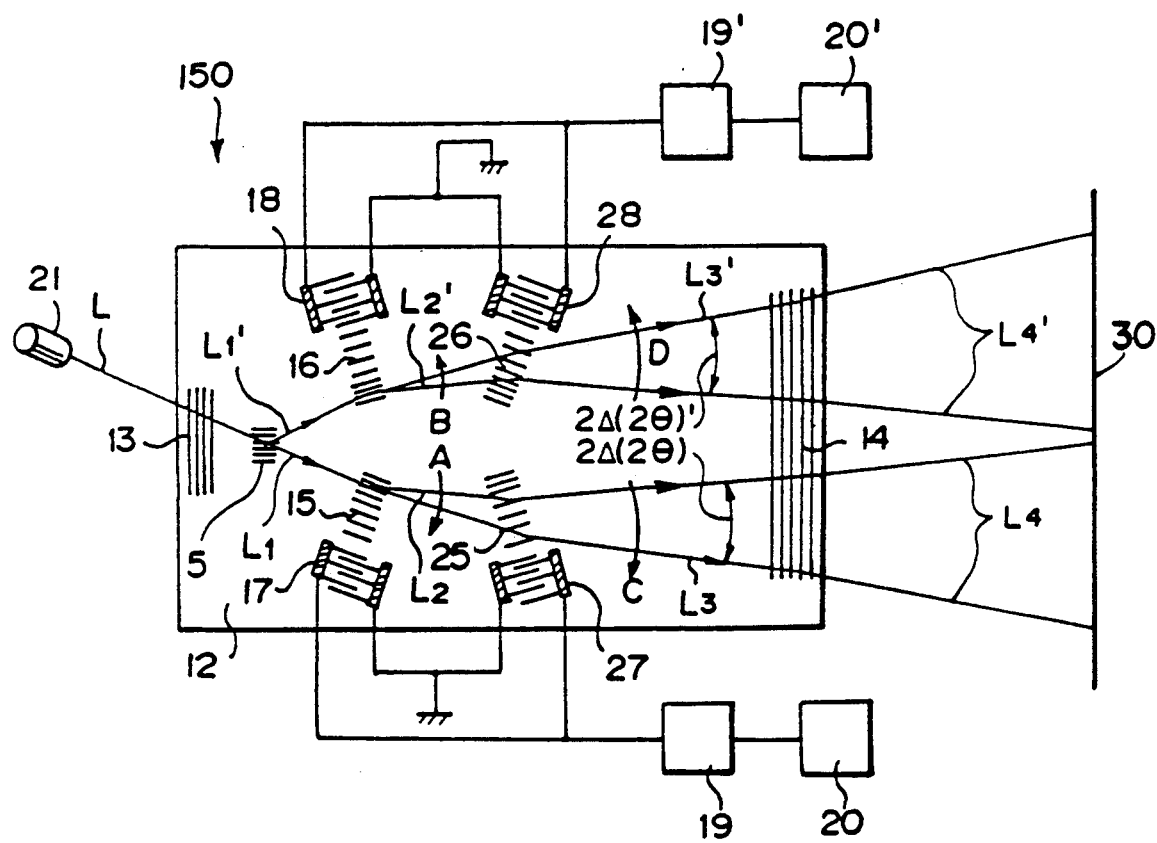
FIG. 13 is a schematic plan view of a light be deflector according to a fourth embodiment of the present invention.

FIG. 13 illustrates a light beam deflector 150 according to a fourth embodiment of the present invention. The light beam deflector 150 indicates first and third tilted-finger chirped IDTs 17, 27 adjacent to each other and second and fourth tilted-finger chirped IDTs 18, 28 adjacent to each other.

The light beam deflector 150 differs from the light beam deflector 50 of the second embodiment in that the first, second, third, and fourth tilted-finger chirped IDTs 17, 18, 27, 28 are arranged on the optical waveguide 12 such that the light beams $L_4$, $L_4'$ emitted out of the optical waveguide 12 will not overlap each other on the surface 30, but are directed parallel to each other toward the surface 30. Therefore, the light beams $L_4$, $L_4'$ provide separate main scanning lines on the surface 30. As with the light beam deflector 110, two images can simultaneously be recorded or read out using the light beam deflector 150.

The two light beams $L_1$, $L_1'$ are split from the light beam L emitted by the single light source 21. Consequently, the intensities of the light beams $L_4$, $L_4'$ remain equal to each other at all times.

In the light beam defletor 150, the deflection angle ranges $\Delta\delta$, $\Delta\delta'$ of the light beams $L_4$, $L_4'$ emitted out of the optical waveguide 12 are substantially twice the deflection angle ranges of the light beams which are deflected by the respective surface elastic waves 15, 16 in the light beam deflector 110. The light beam deflector 150 therefore allows a wider region or length to be scanned by the light beams than is possible with the light beam deflector 110, and hence it can record or read out a larger image.

The light beam deflectors 110, 150 of the third and fourth embodiments may be modified in the same manner as described above with reference to the light beam deflectors 10, 50 of the first and second embodiments.

In the light beam deflectors 10, 50 of the first and second embodiments described above, the two light beams deflected by the respective surface elastic waves meet at the surface 30. In the light beam deflector 50, moreover, the light beams deflected by a first pair of surface elastic waves are further deflected by a second pair of surface elastic waves to provide a wider deflection angle range. Therefore, the intensities of the deflected light beams do not suffer from variations or fluctuations which would otherwise be produced when deflecting the light beams through such a wide deflection angle range. The light beam deflectors 10, 50 can therefore record or read out images highly accurately. Since the deflection angle range is wide, the distance from the light beam deflector to the surface being scanned may be reduced, and therefore the size of a light scanning recording or reading apparatus in which a light beam deflector of the invention is incorporated may also be reduced.

Furthermore, inasmuch as a single light beam is divided into two light beams which are separately deflected in the light beam deflectors 10, 50, the intensities of the light beams to be combined on the surface 30 are equal to each other at all times. In cases where the light beam deflectors 10, 50 are incorporated into a light scanning recording or reading apparatus, a recorded image is prevented from having different densities and an image signal read from a recorded image is prevented from having different levels on the righthand and lefthand sides of a main scanning line on the surface 30.

In the light beam deflectors 110, 150 of the third and fourth embodiments, the two light beams deflected by the respective surface elastic waves scan separate areas of the surface 30. In the light beam deflector 150, moreover, the light beams deflected by a first pair of respective surface elastic waves are further deflected by a second pair of surface elastic waves. The light beam deflectors 110, 150 thus arranged provide a wide deflection angle range. In the light beam deflector 110 the deflection angle range is substantially twice as large and in the light beam deflector 150 it is substantially four times as large as the deflection angle range of a single light beam divided into two ranges for recording or reading out two images. Accordingly, the light beam deflectors 110, 150 allow images of large size to be recorded or read out. Because the deflection angle range is wide, the distance from the light beam deflector to the surface being scanned may be reduced, and therefore the size of a light scanning recording or reading apparatus in which a light beam deflector of the invention is incorporated may also be reduced.

In addition, inasmuch as a single light beam is divided into two light beams which are separately deflected in the light beam deflectors 110, 150, the intensities of the light beams to be combined on the surface 30 are equal to each other at all times. In cases where the light beam deflectors 110, 150 are incorporated in a light scanning recording or reading apparatus for recording or reading two images simultaneously, the two images recorded on the surface 30 are prevented from having different densities and image signals read from two recorded images are prevented from having different levels.

With the light beam deflectors of the invention, a wide deflection angle range can be obtained without having to increase the frequencies of the respective surface elastic waves. Where IDTs are employed as the means for generating surface elastic waves, therefore, the line widths of the IDTs are not required to be extremely small, and the IDTs used can be manufactured easily with presently available techniques. Additionally, the frequencies of the alternating voltages applied to the IDTs are not required to be extremely high, and hence drivers for the IDTs can be manufactured easily and inexpensively.

The two light beams for scanning the surface 30 are guided and deflected in the common optical waveguide 12. This allows the positions scanned by the two light beams to be precisely adjusted with ease.

Although certain preferred embodiments have been shown and described, it should be understood that many changes and modifications may be made therein without departing from the scope of the appended claims.

I claim:
1. A light beam deflector comprising:
 i) an optical waveguide made of a material capable of propagating surface elastic waves therethrough;
 ii) light beam splitting means for dividing a single light beam introduced into said optical waveguide into a first guided wave and a second guided wave which are to be guided along respective first and second light paths through said optical waveguide;
 iii) first surface elastic wave generating means for generating in said optical waveguide a first surface elastic wave which travels across said first light path to diffract and deflect said first guided wave traveling along said first light path;
 iv) second surface elastic wave generating means for generating in said optical waveguide a second surface elastic wave which travels across said second light path to diffract and deflect said second guided wave traveling along said second light path; and
 v) said first and second surface elastic wave generating means being arranged such that said first and second guided waves emitted out of said optical waveguide will scan a surface along respective aligned lines having ends which are adjacent to each other, wherein said first and second guided waves meet each other at maximum frequencies of said first and second surface elastic waves.

2. A light beam deflector comprising:
 i) an optical waveguide made of a material capable of propagating surface elastic waves therethrough;
 ii) light beam splitting means for dividing a single light beam introduced into said optical waveguide into a first guided wave and a second guided wave which are to be guided along respective first and second light paths through said optical waveguide;
 iii) first surface elastic wave generating means for generating in said optical waveguide a first surface elastic wave which travels across said first light path to diffract and deflect said first guided wave traveling along said first light path;
 iv) second surface elastic wave generating means for generating in said optical waveguide a second surface elastic wave which travels across said second light path to diffract and deflect said second guided wave traveling along said second light path;
 v) third surface elastic wave generating means for generating in said optical waveguide a third surface elastic wave which travels across a light path of said first guided wave deflected by said first surface elastic wave to further diffract and deflect said first guided wave;
 vi) fourth surface elastic wave generating means for generating in said optical waveguide a fourth surface elastic wave which travels across a light path of said second guided wave deflected by said second surface elastic wave to further diffract and deflect said second guide wave;

vii) said first and third surface elastic wave generating means being arranged to continuously vary the frequencies and directions of said first and third surface elastic waves while meeting the conditions:

$$|k_1|+|K_1|=|k_2|$$

$$|k_2|+|K_2|=|k_3|$$

where $|k_1|$ is the wave vector of the first guided wave before it is diffracted by said first surface elastic wave, $|k_2|$ is the wave vector of the first guided wave after it is diffracted by said first surface elastic wave, $|k_3|$ is the wave vector of the first guided wave diffracted by said third surface elastic wave, and $|K_1|$ and $|K_2|$ are the wave vectors of said first and third surface elastic waves;

viii) said second and fourth surface elastic wave generating means being arranged to continuously vary the frequencies and directions of said second and fourth surface elastic waves while meeting the conditions:

$$|k_4|+|K_3|=|k_5|$$

$$|k_5|+|K_4|=|k_6|$$

where $|k_4|$ is the wave vector of the second guided wave before it is diffracted by said second surface elastic wave, $|k_5|$ is the wave vector of the second guided wave after it is diffracted by said second surface elastic wave, $|k_6|$ is the wave vector of the second guided wave diffracted by said fourth surface elastic wave, and $|K_3|$ and $|K_4|$ are the wave vectors of said second and fourth surface elastic waves; and ix) said first, second, third, and fourth surface elastic wave generating means being arranged such that said first and second guided waves emitted out of said optical waveguide will scan a surface along respective aligned lines, having ends which are adjacent to each other.

3. A light beam deflector comprising:
   i) an optical waveguide made of a material capable of propagating surface elastic waves therethrough;
   ii) light beam splitting means for dividing a single light beam introduced into said optical waveguide into a first guided wave and a second guided wave which are to be guided along respective first and second light paths through said optical waveguide;
   iii) first surface elastic wave generating means for generating in said optical waveguide a first surface elastic wave which travels across said first light path to diffract and deflect said first guided wave traveling along said first light path;
   iv) second surface elastic wave generating means for generating in said optical waveguide a second surface elastic wave which travels across said second light path to diffract and deflect said second guided wave traveling along said second light path; and
   v) said first and second surface elastic wave generating means being arranged such that said first and second guided waves emitted out of said optical waveguide will scan a surface without overlapping each other, wherein said first and second guided waves meet each other at maximum frequencies of said first and second surface elastic waves.

4. A light beam deflector comprising:
   i) an optical waveguide made of a material capable of propagating surface elastic waves therethrough;
   ii) light beam splitting means for dividing a single light beam introduced into said optical waveguide into a first guided wave and a second guided wave which are to be guided along respective first and second light paths through said optical waveguide;
   iii) first surface elastic wave generating means for generating in said optical waveguide a first surface elastic wave which travels across said first light path to diffract and deflect said first guided wave traveling along said first light path;
   iv) second surface elastic wave generating means for generating in said optical waveguide a second surface elastic wave which travels across said second light path to diffract and deflect said second guided wave traveling along said second light path;
   v) third surface elastic wave generating means for generating in said optical waveguide a third surface elastic wave which travels across a light path of said first guided wave deflected by said first surface elastic wave to further diffract and deflect said first guided wave;
   vi) fourth surface elastic wave generating means for generating in said optical waveguide a fourth surface elastic wave which travels across a light path of said second guided wave deflected by said second surface elastic wave to further diffract and deflect said second guided wave;
   vii) said first and third surface elastic wave generating means being arranged to continuously vary the frequencies and directions of said first and third surface elastic waves while meeting the conditions;

$$|k_1|+=K_1|=|k_2|$$

$$|k_2|+|K_2|=|k_3|$$

where $|k_1|$ is the wave vector of the first guided wave before it is diffracted by said first surface elastic wave, $|k_2|$ is the wave vector of the first guided wave after it is diffracted by said first surface elastic wave, $|k_3|$ is the wave vector of the first guided wave diffracted by said third surface elastic wave, and $|K_1|$ and $|K_2|$ are the wave vectors of said first and third surface elastic waves;

viii) said second and fourth surface elastic wave generating means being arranged to continuously vary the frequencies and directions of said second and fourth surface elastic waves while meeting the conditions:

$$|k_4|+|K_3|=|k_5|$$

$$|k_5|+|K_4|=|k_6|$$

where $|k_4|$ is the wave vector of the second guided wave before it is diffracted by said second surface elastic wave, $|k_5|$ is the wave vector of the second guided wave after it is diffracted by said second surface elastic wave, $|k_6|$ is the wave vector of the second guided wave diffracted by said fourth surface elastic wave, and $|K_3|$ and $|K_4|$ are the wave vectors of said second and fourth surface elastic waves; and ix) said first, second, third, and fourth surface elastic wave generating means being arranged such that said first and second guided waves emitted out of said optical waveguide will scan a surface without overlapping each other.

5. A light beam deflector according to claim 1 or 3, wherein each of said first and second surface elastic wave generating means comprises a tilted-finger chirped interdigital transducer having electrode fingers spaced at distances which vary stepwise and oriented in directions which vary stepwise, and a driver for applying an alternating voltage with a continuously varying frequency to said tilted-finger chirped interdigital transducer.

6. A light beam deflector according to claim 1 or 3, wherein each of said first and second surface elastic wave generating means comprises a curved-finger interdigital transducer having arcuate electrode fingers spaced at distances which vary stepwise, and a driver for applying an alternating voltage with a continuously varying frequency to said curved-finger interdigital transducer.

7. A light beam deflector according to claim 2 or 4, wherein each of said first, second, third, and fourth surface elastic wave generating means comprises a tilted-finger chirped interdigital transducer having electrode fingers spaced at distances which vary stepwise and oriented in directions which vary stepwise, and a driver for applying an alternating voltage with a continuously varying frequency to said tilted-finger chirped interdigital transducer.

8. A light beam deflector according to claim 2 or 4, wherein each of said first, second, third, and fourth surface elastic wave generating means comprises a curved-finger interdigital transducer having arcuate electrode fingers spaced at distances which vary stepwise, and a driver for applying an alternating voltage with a continuously varying frequency to said curved-finer interdigital transducer.

9. A light beam deflector comprising:
i) an optical waveguide made of a material capable of propagating surface elastic waves therethrough;
ii) light beam splitting means for dividing a single light beam introduced into said optical waveguide into a first guided wave and a second guided wave which are to be guided along respective first and second light paths through said optical waveguide;
iii) first surface elastic wave generating means for generating in said optical waveguide a first surface elastic wave which travels across said first light path to diffract and deflect said first guided wave traveling along said first light path;
iv) second surface elastic wave generating means for generating in said optical waveguide a second surface elastic wave which travels across said second light path to diffract and deflect said second guided wave traveling along said second light path;
v) third surface elastic wave generating means for generating in said optical waveguide a third surface elastic wave which travels across a light path of said first guided wave deflected by said first surface elastic wave to further diffract and deflect said first guided wave;
vi) fourth surface elastic wave generating means for generating in said optical waveguide a fourth surface elastic wave which travels across a light path of said second guided wave deflected by said second surface elastic wave to further diffract and deflect said second guided wave;
vii) said first and third surface elastic wave generating means being arranged to continuously vary the frequencies and directions of said first and third surface elastic waves while meeting the conditions;

$$|k_1|+|K_1|=|k_2|$$

$$|k_2|+|K_2|=|k_3|$$

where $|k_1|$ is the wave vector of the first guided wave before it is diffracted by said first surface elastic wave, $|k_2|$ is the wave vector of the first guided wave after it is diffracted by said first surface elastic wave, $|k_3|$ is the wave vector of the first guided wave diffracted by said third surface elastic wave, and $|K_1|$ and $|K_2|$ are the wave vectors of said first and third surface elastic waves;

viii) said second and fourth surface elastic wave generating means being arranged to continuously vary the frequencies and directions of said second and fourth surface elastic waves while meeting the conditions:

$$|k_4|+|K_3|=|k_5|$$

$$|k_5|+|K_4|=|k_6|$$

where $|k_4|$ is the wave vector of the second guided wave before it is diffracted by said second surface elastic wave, $|k_5|$ is the wave vector of the second guided wave after it is diffracted by aid second surface elastic wave, $|k_6|$ is the wave vector of the second guided wave diffracted by said fourth surface elastic wave, and $|K_3|$ and $|K_4|$ are the wave vectors of said second and fourth surface elastic waves; and ix) said first, second, third, and fourth surface elastic wave generating means being arranged such that said first and second guided waves emitted out of said optical waveguide will scan a surface without overlapping each other; and wherein each of said first, second, third, and fourth surface elastic wave generating means comprises a tilted-finger chirped interdigital transducer having electrode fingers spaced at distances which vary stepwise and oriented in directions which vary stepwise, and a driver for applying an alternating voltage with a continuously varying frequency to said tilted-finger chirped interdigital transducer; and wherein the mth and (m+2)th surface elastic wave generating means are arranged to generate surface elastic waves of the same frequency and having frequencies varying from $f_1$ to $f_2$ ($f_2 \approx 2f_1$);

said interdigital transducer of said mth surface elastic wave generating means having an electrode finger portion for generating a surface elastic wave having the frequency $f_1$, said electrode finger portion lying at an angle of $\theta/2$ with respect to the direction of travel of the mth guided wave $L_1$ incident upon the mth surface elastic wave having the frequency $f_2$, where $\theta$ is the angle of incidence of said mth guided wave $L_1$ upon said mth surface elastic wave; and said interdigital transducer of said (m+2)th surface elastic wave generating means having electrode finger portions for generating surface elastic waves having the frequencies $f_2$ and $f_1$, said electrode finger portions lying at angles of $3\theta$, $3\theta/2$, respectively, with respect to the direction of travel of the mth guided wave $L_1$.

10. A light beam deflector according to claim 9, wherein the interdigital transducers of said mth and (m+2)th surface elastic wave generating means are energizable by a common driver.

11. A light beam deflector comprising:
i) an optical waveguide made of a material capable of propagating surface elastic waves therethrough;
ii) light beam splitting means for dividing a single light beam introduced into said optical waveguide into a first guided wave and a second guided wave which are to be guided along respective first and second light paths through said optical waveguide;
iii) first surface elastic wave generating means for generating in said optical waveguide a first surface elastic wave which travels across said first light path to diffract and deflect said first guided wave traveling along said first light path;
iv) second surface elastic wave generating means for generating in said optical waveguide a second surface elastic wave which travels across said second light path to diffract and deflect said second guided wave traveling along said second light path;
v) third surface elastic wave generating means for generating in said optical waveguide a third surface elastic wave which travels across a light path of said first guided wave deflected by said first surface elastic wave to further diffract and deflect said first guided wave;
vi) fourth surface elastic wave generating means for generating in said optical waveguide a fourth surface elastic wave which travels across a light path of said second guided wave deflected by said second surface elastic wave to further diffract and deflect said second guided wave;
vii) said first and third surface elastic wave generating means being arranged to continuously vary the frequencies and directions of said first and third surface elastic waves while meeting the conditions;

$$|k_1| + |K_1| = |k_2|$$

$$|k_2| + |K_2| = |k_3|$$

where $|k_1|$ is the wave vector of the first guided wave before it is diffracted by said first surface elastic wave, $|k_2|$ is the wave vector of the first guided wave after it is diffracted by said first surface elastic wave, $|k_3|$ is the wave vector of the first guided wave diffracted by said third surface elastic wave, and $|K_1|$ and $|K_2|$ are the wave vectors of said first and third surface elastic waves;
viii) said second and fourth surface elastic wave generating means being arranged to continuously vary the frequencies and directions of said second and fourth surface elastic waves while meeting the conditions:

$$|k_4| + |K_3| = |k_5|$$

$$|k_5| + |K_4| = |k_6|$$

where $|k_4|$ is the wave vector of the second guided wave before it is diffracted by said second surface elastic wave, $|k_5|$ is the wave vector of the second guided wave after it is diffracted by said second surface elastic wave, $|k_6|$ is the wave vector of the second guided wave diffracted by said fourth surface elastic wave, and $|k_3|$ and $|K_4|$ are the wave vectors of said second and fourth surface elastic waves; and
ix) said first, second, third, and fourth surface elastic wave generating means being arranged such that said first and second guided waves emitted out of said optical waveguide will scan a surface without overlapping each other;
wherein each of said first, second, third and fourth surface elastic wave generating means comprises a curved-finger interdigital transducer having arcuate electrode fingers spaced at distances which vary stepwise, and a driver for applying an alternating voltage with a continuously varying frequency to said curved-finger interdigital transducer; and
wherein the mth and (m+2)th surface elastic wave generating means are arranged to generate surface elastic waves of the same frequency and having frequencies varying from $f_1$ to $f_2$ ($f_2 \approx 2f_1$);
said interdigital transducer of said mth surface elastic wave generating means having an electrode finger portion for generating a surface elastic wave having the frequency $f_1$, said electrode finger portion lying at an angle of $\theta/2$ with respect to the direction of travel of the mth guided wave $L_1$ incident upon the mth surface elastic wave having the frequency $f_2$, where $\theta$ is the angle of incidence of said mth guided wave $L_1$ upon said mth surface elastic wave; and
said interdigital transducer of said (m+2)th surface elastic wave generating means having electrode finger portions for generating surface elastic waves having the frequencies $f_2$ and $f_1$, said electrode finger portions lying at angles of $3\theta$, $3\theta/2$, respectively, with respect to the direction of travel of the mth guided wave $L_1$.

12. A light beam deflector according to claim 11, wherein the interdigital transducers of said mth and (m+2) surface elastic wave generating means are energizable by a common driver.

* * * * *